3,629,166
COATING COLOR, A COATED PAPER APPLIED WITH SAID COATING COLOR AND A PROCESS FOR PREPARING SAID COATED PAPER
Shonosuke Takahashi, Yonago-shi, and Mitsuo Tanaka, Sakai-shi, Japan, assignors to Nippon Pulp Industry Co., Ltd., Tokyo, Japan, and Arakawa, Rinsan Kagaku Kogyo Kabushiki Kaisha, Osaki-shi, Japan
No Drawing. Filed Feb. 18, 1969, Ser. No. 800,293
Claims priority, application Japan, July 26, 1968, 43/52,424
Int. Cl. C08b 25/02; D21h 1/24, 1/28
U.S. Cl. 260—17.3    5 Claims

ABSTRACT OF THE DISCLOSURE

A water-insolubilized coated paper prepared by applying a coating color having pH over 8.0 to a paper, the coating color being prepared by subjecting an aqueous starch solution to cooking treatment together with amine modified urea formaldehyde resin in the presence of acid catalyst and mixing the water insolubilized starch solution thus obtained with pigment containing at least a part of alkaline pigment.

---

This invention relates to a coating color (over pH 8.0) prepared by mixing a pigment to a binder consisted mainly of a modified starch solution obtained by subjecting starch and amine modified urea-formaldehyde resin to cooking treatment.

This invention also relates to a coated paper having improved water-resistance surface strength and printability which is prepared by applying aforesaid coating color to a paper.

This invention further relates to a process for preparing aforesaid coated paper which comprises applying said coating color to a paper.

Hitherto known starch binder is hardly render papers water-resistance and cannot be used together with alkaline pigments.

An object of this invention is to provide a coating color including intimately alkaline pigments.

Another object of this invention is to provide coated papers having neutral or slight alkaline surface, having so high water-resistance as it is fit for offset printing, having improved ink-drying property -receptivity, -holdout and printing gloss (these properties are named generally as printability below) and provided with excellent characteristics of alkaline pigment, for example, excellent whiteness and opacity of calcium carbonate and satin-white and the like.

Further another object of this invention is to provide a process for preparing effectively aforesaid coated papers having improved water-resistance, surface strength and printability.

Hitherto, casein has been principally utilized as a binder for coating paper. However, since the casein is expensive, starch is used at present instead of casein. Starch is inexpensive but it is not water-resistance. Various methods for rendering papers water-resistance have been proposed. For example, as hitherto known technique starch is used together with aminoplasts resin such as melamine-formaldehyde resin and urea-formaldehyde resin. Further a binder for coating papers which is prepared by incorporating a synthetic resin latex into said water-insolubilized starch solution is also known.

These known binders, however, are accompanied with the following grave defects. That is to say, in order to render the coated papers good water-resistance, coating colors consisting of said binder and pigment must have pH in the range from neutral to acid. Accordingly, utilizable pigments are restricted to acid or neutral pigments only such as clay, titanium dioxide, talc, barium sulfate and the like. Further the surface of coated paper produced become naturally acid state.

In order to improve the printability of the coated paper when it is printed, it is necessary to make the surface of the coated paper neutral or slight alkaline pH and therefore to use alkaline pigment such as calcium carbonate, satin-white, aluminium hydroxide, magnesium hydroxide, zinc oxide and the like. Many alkaline pigments render whiteness and opacity to the coated paper like calcium carbonate and satin-white. Further there are many alkaline pigments to be used for controlling the gloss of coated paper.

When an alkaline coating color is prepared using known water-insolubilized starch solution, namely when a coating color is prepared by mixing said starch solution with an alkaline pigment, it is impossible to render a coated paper water-resistance and the coated paper cannot be proof against commercial offset printing. On the other hand, if in order to render a satisfactory water-resistance, acid pigment only is used pH of the coated paper surface will become acid state and the printability is remarkably deteriorated. That is to say, it is impossible to prepare, in accordance with a conventional technique, a coated paper having a high water-resistance, surface strength and excellent printability by use of the starch binder.

Further, in order to prepare a coated paper having a high water-resistance using hitherto known starch and acid pigment, the coated paper just after coating is required to be cured at a high temperature even if pH of the coating color is in acid side and the coated paper thus prepared must be subjected to an aging for a long period of time.

According to the present invention above mentioned defects may be fully eliminated and good coated papers which have high water-resistance, surface strength and excellent printability and which are applicable to offset printing may be economically prepared without necessity of aging for a long period of time even an alkaline coating color over pH 8.0 is used and even when the coated paper is cured at a lower temperature.

According to the present invention a coating color over pH 8.0 may be prepared by adding to 15–40% starch solution 2.5–25 parts by weight of amine modified urea-formaldehyde resin per 100 parts by weight of starch, subjecting the mixture to cooking treatment in the presence of acid catalyst and by mixing the binder consisting of water-insolubilized starch solution thus obtained with a pigment containing at least a part of alkaline pigment.

According to the present invention a coated papers having improved water-resistance, surface strength and printability may be prepared by applying aforesaid coating color to papers.

The binder for preparing the coating color of this invention may be contained suitable amount of synthetic resin latex in addition to the water-insolubilized starch solution.

Now, the present invention will be explained more in detail as follows.

The object of the present invention cannot be attained by use of known melamine-formaldehyde resin or urea-formaldehyde resin but may be first attained by use of amine modified urea-formaldehyde resin.

The amine modified urea-formaldehyde resin may be prepared by subjecting urea and formaldehyde to condensation reaction in the presence of polyalkylene polyamine represented by the general formula $$H_2N(C_nH_{2n}HN)_xH$$

($n=2$ or $3$, $x=1$ or more).

According to the present invention, in order to improve solubility of said resin and to increase pot life of aqueous solution of the resin and thereby to make the preparation of a coating color having desired viscosity possible, poly-saccharide or monosaccharide such as dextrine, sucrose, glucose (name generally below as low viscosity saccharide) may be added to the condensation reaction system. It is preferable to make the amount of said saccharide to be used 5–15% by weight against urea used and to add together with urea and formaldehyde to react.

Properties of the amine modified urea-formaldehyde resin solution may be selected at will but in order to obtain the excellent water insolubilized starch solution a good transparent binder of pH 7.5–8.5 and viscosity of 20–150 cps., preferably 50–110 cps. (at 25° C.) at 40% solid concentration is particularly desirable. Said concentration is not necessarily required to be 40%.

According to the present invention, said amine modified urea-formaldehyde resin is subjected to a cooking treatment together with aqueous starch solution in the presence of acid catalyst to give a water-insolubilized starch solution. The suitable concentration of solid in the aqueous starch solution in the cooking treatment is 15–40%. The treatment for water-insolubilized starch is preferable to be carried out in the range of as high concentration of solid in the aqueous starch solution as possible but is restricted by the following matters. Namely it is desirable to control the upper limit of the concentration of solid below 40% in view of the viscosity of the starch paste liquor at the time of cooking treatment and increase of the viscosity with lapse of time during its preservation after the cooking treatment. On the contrary, the aqueous starch solution in which the concentration of solid is below 15% is not useful in practice. For the cooking treatment it is necessary to add, in the course of cooking of starch, about 2.5–25 parts by weight of amine modified urea-formaldehyde resin calculated in the term of solid per 100 parts by weight of starch and to mix them fully with stirring under heating. If the amount of amine modified urea-formaldehyde resin is less than 2.5 parts by weight it is impossible to render the coated paper sufficient water-resistance. On the contrary if the amount of the resin is more than 25 parts by weight the viscosity of the coating color becomes excessively so high as to make coating operation difficult.

The temperature and time for the cooking treatment have an important effect on the presentation of water-resistance. The higher of the reaction temperature the shorter of the time for treatment and vice versa. In order to finish the water-insolubilizing reaction within the time for treatment, it is advisable to make the temperature for treatment over 70° C.

For starch, all of starch derivatives such as oxidized starch, enzyme converted starch, acid hydrolyzed starch, etherificated starch, etherificated starch which have been heretofore utilized as a binder of this kind may be employed. For the acid catalyst there may be mentioned strong acid substance such as sulfuric acid, hydrochloric acid and the like or weak acid substance such as ammonium sulfate, ammonium hydrogen phosphate, ammonium chloride and the like. When the strong acid substance is used it is advisable to make pH in the cooking treatment 3.5–5.5. When the weak acid substance is used pH cannot be sometimes adjusted to 3.5–5.5. In this case the same result may be obtained by use as large amount as 10–30% against the solid of resin. We have found that ammonium chloride is a particularly desirable catalyst in that formaldehyde odor of the starch (solution) obtained may be eliminated.

After the completion of cooking treatment the binder is neutralized with alkali to suppress the increase of the viscosity and to improve stability.

The water-insolubilized starch binder thus obtained is a semitransparent solution of concentration 15–45%, pH 7.5–8.5. Even by use of this binder only, if alkaline pigment is incorporated an alkaline coating color over pH 8.0 may be prepared and excellent coated paper can be produced.

If still more high water-resistance and surface strength of the coated paper are desired it is advisable to use suitable amount of synthetic resin latex emulsion together with the water-insolubilized starch solution to make a binder. For the synthetic resin latex emulsion there may be mentioned styrene-butadiene copolymer, acrylonitrile-butadiene copolymer, methacrylic ester-butadiene copolymer, vinyl acetate-chloride copolymer, vinyl chloride-vinylidene chloride copolymer, polyethylene-vinyl acetate copolymer, methacrylic acid-butadiene copolymer, methacrylic acid-styrene-butadiene copolymer and the like. The latex emulsion is preferable to be incorporated with 50–200 parts by weight in the form of solid to 100 parts by solid weight of the starch solution.

According to the present invention, the coating color may be prepared by mixing pigment with the binder by means of any hitherto known method. For the pigment, alkaline pigment may be used alone or in combination with acid and (or) neutral pigment. In order to prepare the coated paper having an excellent printability, it is required to adjust pH of the coating color to over 8.0 by mixing always at least a part of alkaline pigment.

According to the present invention, the properties of the coating color (in particular viscosity, fluidity) may be varied at will in accordance with a coating system. For example, for an air-knife coating a coating color of somewhat lower viscosity is suitable but for a roll coating a coating color of higher viscosity is desirable. These coating colors having properties suitable for each coating system may be prepared by adjusting the properties (concentration, viscosity) of amine modified urea-formaldehyde resin and the properties of starch solution.

The coated papers may be prepared by hitherto known methods, for example, by applying the coating color to papers by roll coating machine, blade coating machine and air-knife coating machine. The amount of the coating color to be applied is determined basing upon the characters of desired coated papers.

Now, specific effects of the present invention will be explained as follows.

In the manufacturing of the coated paper three factors the quality, the prime cost and operative efficiency are important. According to the present invention each of these three important factors can be satisfied with remarkable advantages. That is to say, since in the present invention the water-insolubilized starch solution prepared by subjecting inexpensive starch and amine modified urea-formaldehyde resin to cooking treatment is used as a binder, a coating color will be very inexpensive. And the coating color suitable for coatings have excellent water-resistance prepared using alkaline pigment which could not be used together with hitherto known starch solution in spite of excellent whiteness and opacity of these pigments, may be effectively utilized. Further the surface of the coated paper may be retained at neutral or slight alkaline pH by applying the present coating color so that ink drying property of the coated paper is improved and ink set off at printing is also improved. Moreover owing to the improvement of ink drying property, the penetration of ink into paper is controlled and thereby offset printability such as print gloss, print density is remarkably improved.

As described above, according to the present invention, the desired printability may be obtained by employment of alkaline pigment alone or in combination with acid pigment (clay, talc, titanium dioxide). Further, due to the employment of starch as a binder the prime cost of the coating color may be markedly diminished and the viscosity of the coating color may be readily altered by changing the cooking treatment condition so that the coating color can be commercially applied to any coating machine.

Further, the present invention is also characterized by the fact that in the present invention the coated papers having excellent water-resistance and surface strength may be produced even though the papers just after coating are cured at relatively low temperature and further even though the coated papers are not aged for a long period of time.

The specific effects of the present invention will be made clear in the examples.

The present invention will be now explained more in detail by way of examples as follows.

EXAMPLE 1

Preparation of amine modified urea-formaldehyde resin

Urea, 10% by weight of dextrine against urea and 10% by weight of triethylene tetramine were uniformly dispersed in 24 times mol of 37% Formalin against urea and reacted for 3 hours at 50° C. under heating. The reaction mixture was adjusted to pH 4.5 by adding 20% hydrochloric acid and the reaction was continued for 1.5 hours under stirring at 80° C. When the viscosity of the reaction solution at 30° C. became 350 cps. the reaction solution was neutralized with sodium hydroxide to pH 8.0. The solution thus obtained was diluted with water to give a yellow transparent resin solution of concentration 40% and the viscosity 95 cps.

Preparation of starch solution

Aqueous solution of enzyme converted starch of 30% concentration prepared at 60° C. was diluted with water to 20% concentration. To this solution 10% of above amine modified urea-formaldehyde resin calculated in the term of solid against starch was added and 15% of ammonium chloride against resin was also added. This mixture was cooked at 95° C. for 30 minutes with stirring. After cooling to 80° C. the mixture was adjusted to pH 8.5 with sodium hydroxide to give water-insolubilized starch solution.

Preparation of coating color

Following two kinds of coating color (A) and (B) were prepared using the above starch solution as binder.

Coating color-A: Parts by weight
Kaolinite clay _____ 60
Calcium carbonate _____ 40
Starch solution (as solid) _____ 25
Sodium pyrophosphate _____ 0.5
Concentration 40%, pH 9.1.

Coating color-B:
Kaolinite clay _____ 60
Satin white _____ 40
Starch solution (as solid) _____ 30
Sodium pyrophosphate _____ 0.5
Concentration 40%, pH 11.2.

Preparation of coated papers

Each of the above coating colors (A) and (B) were applied to base papers (wood free fine papers) with air-knife coating machine so that bone dried coating weight may become 20 g./m.$^2$/side and subjected to super-calender finishing to give two kinds of coated papers. The coated papers applied with the coating color-A was named as 1–A and the coated paper applied with the coating color-B was named as 1–B. This coating operation was done under the following conditions.

Machine speed: 100 m./min.
Drier temperature: 150° C.

In addition, as a comparative Example 1 a coated paper having the same degree of water-resistance as that in Example 1 was prepared using another binder different from that of the present invention as follows. Comparative Example 1.

A water-insolubilized starch solution was prepared using amine nonmodified urea-formaldehyde resin in the same manner as in Example 1. A coating color of the following composition was prepared using the starch solution thus prepared as a binder.

Coating color-A: Parts by weight
Kaolinite clay _____ 100
Starch solution (as solid) _____ 25
Sodium pyrophosphate _____ 0.5
Concentration 40%, pH 6.0.

A coated paper was prepared in the same manner as in Example 1. Each coated paper prepared in Example 1 and comparative Example 1 were comparatively tested. The results were shown in Table 1. Each tests were performed by the following methods.

(1) Surface pH of the coated paper: On 7th day after coating measurement was done with surface pH-indicator.

(2) Water-resistance: By an improved Adams wet-rub-test. That is to say, the coated paper of 3 x 10 cm. was set on a rubber roll which was then contacted with a metallic roll. Under the roll 30 cc. of distilled water was placed. Measured the transparency of distilled water when the roll was rotated and the coating color eluted. Therefore, the greater in numerical value the better the water-resistance.

(3) Whiteness and opacity: Measured with Hunter Reflectometer. The greater in numerical value the better.

(4) Ink drying property: 0.110–0.125 g. of ink was printed on a coated paper of 23.5 x 17 cm. and left alone for 10 minutes. Thereafter the printed paper was put on a standard paper (no printed) to offset the ink. This standard paper was measured by Hunter Reflectometer. The greater in numerical value the better.

(5) Ink acceptability: It was functionally judged from the amount of ink and uniformity of ink film printed on surface of a coated paper.

(6) Print gloss: Printed paper was measured with a glossmeter. The greater in numerical value, the better in gloss.

TABLE 1

| | Quantity | | | | Printability | | |
|---|---|---|---|---|---|---|---|
| Coated paper | Surface pH of coated paper | Water-resistance (percent) | Whiteness (percent) | Opacity (percent) | Ink drying property | Ink acceptability | Print gloss (percent) |
| Example 1–A | 7.0 | 71.4 | 80.3 | 95.3 | 40.1 | Very good | 51.1 |
| Example 1–B | 8.0 | 71.2 | 82.2 | 95.6 | 59.3 | Excellent | 65.2 |
| Comparative Example 1 | 4.5 | 70.9 | 76.9 | 95.5 | 21.2 | Good | 59.2 |

As it is clear from the above table, if non-modified urea-formaldehyde resin is used, only acid pigment can be used in order to render a coated paper water-resistance. Therefore, pH of the coated paper surface drops to 4.5 and its ink drying property becomes worse. On the contrary, if the binder of this invention is used, a coated paper having high water-resistance and excellent printability may be obtained even if the coating color is alkalized.

EXAMPLE 2

Preparation of starch binder

30% aqueous starch solution was prepared by heating a mixture of oxidized starch and water at 95° C. for 30 minutes while stirring. To this starch solution, amine modified urea-formaldehyde resin similar to that used in the Example 1 was added in the amount corresponding to 15% of starch and further 6 N-hydrochloric acid was added to adjust pH to 4.0 and then the mixture was subjected to cooking treatment at 80° C. for 40 minutes while stirring and was adjusted to pH to 8.0 with sodium hydroxide to give a water-insolubilized starch solution.

Preparation of coating color

Coating color-C: Parts by weight
- Kaolinite clay _____ 60
- Satin white _____ 40
- Starch solution (as solid) _____ 30
- Sodium pyrophosphate _____ 0.3

Concentration 35%, pH 11.0.

Preparation of coated papers

The coated papers were prepared in the same method as in Example 1 except adoption of two different temperatures 105° C. and 150° C.

Comparative Example 2.—A starch solution was prepared by merely mixing uniformly at a room temperature the same 30% aqueous starch solution as that used in the Example 2 with amine modified urea-formaldehyde resin in the presence of ammonium chloride in the amount corresponding to 15% of said resin without subjecting to cooking treatment. The starch solution thus prepared was used as a binder. Coating color and coated papers were prepared by the same method as in the Example 2.

The result obtained from tests of qualities of the coated papers prepared in the Example 2 and the comparative Example 2 are shown in the following Table 2.

The surface strength are shown in I.G.T. Pick value. (Ink; I.P.I. tack grade ink #3, Printing; Machine Direction, Spring Tension; B)

TABLE 2

| Coated papers | Drying temperature (° C.) | Water resistance (percent) | Surface strength I.G.T. pick value (cm./sec.) |
|---|---|---|---|
| Example 2 | 105 | 68 | 259 |
|  | 150 | 71 | 268 |
| Comparative Example 2 | 105 | 30 | 230 |
|  | 150 | 35 | 234 |

As it is clear from the above Table 2, the coated papers can be rendered definitely water-resistance and further no higher drying temperature for curing is required when amine modified urea-formaldehyde and starch are subjected to cooking treatment as in the present invention. On the contrary, if amine modified urea-formaldehyde resin and starch are not subjected to cooking treatment, however the drying temperature is elevated the water-resistance of the coated papers does not improve.

EXAMPLE 3

Preparation of coating color

Two kinds of coating colors having the following compositions were prepared using the same starch solution as that used in the Example 1 and synthetic resin latex.

Coating color-D: Parts by weight
- Kaolinite clay _____ 80
- Calcium carbonate _____ 20
- Starch solution (as solid) _____ 18
- Styrene-butadiene latex (as solid) _____ 7
- Sodium pyrophosphate _____ 0.1 pH 8.5.

Coating color-E:
- Kaolinite clay _____ 85
- Satin white _____ 15
- Starch solution (as solid) _____ 20
- Styrene-butadiene latex (as solid) _____ 10
- Sodium pyrophosphate _____ 0.1 pH 11.5.

Preparation of coated papers

The above coating colors were all prepared in 56% solid concentration. These coating colors were applied to both sides of wood free fine papers with blade coating machine so that bone dried coating weight may become 12 g./m.$^2$/side. The coating operation was done under the following conditions.

Machine speed: 350 m./min.
Drier temperature: 150° C.

The coated papers thus prepared were subjected to super-calender finishing. The coated paper applied with the coating color-D was named as 3–4 and the coated paper applied with the coating color-E was named as 3–E.

Comparative Example 3.—A starch solution was prepared in the same manner as in Example 3 using a commercial melamine-formaldehyde resin instead of amine modified urea-formaldehyde resin in the Example 3. Coating color and coated papers were prepared by the same method as in the Example 3.

The qualities of the coated papers on 4th day and 20th day after each preparation in the Example 3 and the comparative Example 3 are shown in the following Table 3.

TABLE 3

| Coated papers | Surface pH of coated paper | Water-resistance (percent) 4th day | 20th day |
|---|---|---|---|
| Example 3-D | 7.5 | 65 | 75 |
| Example 3-E | 8.0 | 65 | 75 |
| Comparative Example 3-D | 7.5 | 35 | 45 |
| Comparative Example 3-E | 8.0 | 30 | 40 |

As it is clear from the Table 3, if the binder of the present invention is used the coated papers may be rendered an excellent water resistance even pH of the coating color is made over 8.0 and the coated paper surface is in the field from neutral to slight alkaline pH. Further such practically strong water-resistance can be obtained in a short time. On the contrary, a starch solution subjected to cooking treatment with known melamine-formaldehyde resin will give a coated surface with insufficient water-resistance in the pH range from neutral to slight alkaline even when styrene-butadiene latex is used together with the starch solution. The coated paper thus obtained could not be used for usual offset printing purpose.

EXAMPLE 4

Preparation of coating color

Two kinds of coating colors of the following compositions were prepared using the same starch solution as used in the Example 2 and a synthetic resin latex as a binder.

Coating color-F: Parts by weight
- Kaolinite clay _____ 80
- Calcium carbonate _____ 20
- Starch solution (as solid) _____ 13
- Styrene-butadiene latex (as solid) _____ 12
- Sodium pyrophosphate _____ 0.1 pH 8.5.

Coating color-G: Parts by weight
    Kaolinite clay _____ 85
    Satin white _____ 15
    Starch solution (as solid) _____ 15
    Styrene-butadiene latex (as solid) _____ 15
    Sodium pyrophosphate _____ 0.2
pH 11.5.

Preparation of coated papers

The above coating colors were all prepared in 49.5% solid concentration. These coating colors were applied to both sides of wood free fine papers with roll coating machine so that bone dried coating weight may become 13 g./m.$^2$/side. The coating operation was done under the following conditions.

Machine speed: 300 m./min.
Drier temperature: 150° C.

The coated papers thus prepared were subjected to super-calender finishing. The coated papers applied with the coating color-F and coating color-G were named as 4-F and 4-G respectively.

Comparative Example 4.—A starch solution was prepared in the same manner as in Example 4 using a commercial melamine-formaldehyde resin instead of amino modified urea-formaldehyde resin in the Example 4. Coating color and coated papers were prepared by the same method as in the Example 4.

The qualities of the coated papers on 4th day and 20th day after each preparation in the Example 4 and the comparative Example 4 are shown in the following Table 4.

TABLE 4

| Coated papers | Surface pH of coated paper | Water-resistance (percent) | |
| --- | --- | --- | --- |
| | | 4th day | 20th day |
| Example 4-F | 7.5 | 85 | 95 |
| Example 4-G | 8.0 | 85 | 95 |
| Comparative Example 4-F | 7.5 | 60 | 70 |
| Comparative Example 4-G | 8.0 | 50 | 60 |

As it is clear from the Table 4, if the starch solution of the present invention is used together with about equal amounts of styrene-butadiene latex as a binder, the coated papers having nearly perfect water-resistance may be prepared even though the surface of the coated paper is in the field from neutral to alkaline pH. The binder of the present invention, therefore, may be effectively applied to paper such as a label paper which requires very high water-resistance and excellent printability.

While if the starch solution treated with the known melamine-formaldehyde resin is used together with about equal amount of styrene-butadiene latex as a binder instead of the present binder, it is impossible to render the coated paper perfect water-resistance even though the surface of the coated paper is made neutral or slight alkaline state. Such binder, therefore, cannot be applied to a paper such as a label paper which requires very high water-resistance and excellent printability.

We claim:

1. A coating color having pH over 8.0 which comprises a binder having improved water resistance and alkaline pigment in an amount sufficient to render said binder alkaline, the binder being prepared by subjecting an aqueous starch solution to cooking treatment together with about 2.5 to 25 parts of urea-formaldehyde resin modified with polyalkylene polyamine represented by the formula $H_2N(C_nH_{2n}NH)_xH$, wherein $n=2$ or 3 and $x=1$ or more, per 100 parts of starch, in the presence of acid catalyst selected from the group consisting of mineral acid and its ammonium salt.

2. The coating color of claim 1 wherein the solid concentration of the aqueous starch solution subjected to the cooking treatment is about 15 to 40%.

3. A process for preparing a modified-starch coated paper having excellent printability and improved water resistance which comprises adding aqueous starch solution having a solids concentration of about 15–40%, about 2.5–25 parts by weight of urea-formaldehyde resin modified with polyalkylene polyamine represented by the formula $H_2N(C_nH_{2n}NH)_xH$, wherein $n=2$ or 3 and $x=1$ or more per 100 parts of starch, subjecting the mixture to cooking treatment, in the presence of acid, catalyst selected from the group consisting of mineral acid and its ammonium salt, mixing the modified starch solution thus obtained with alkaline pigment in an amount sufficient to provide a coating color having pH over 8.0, applying the resulting coating color to paper and drying.

4. A coated paper the surface of which is neutral or a slightly alkaline state, prepared by the process claimed in claim 3, which has improved ink drying property, ink receptivity, printing gloss, ink hold out and excellent water-resistance.

5. A coating color having pH over 8.0 which contains a suitable amount of synthetic resin latex in addition to the water-insolubilized starch solution claimed in claim 1.

References Cited

UNITED STATES PATENTS

| 3,030,324 | 4/1962 | Booty | 260—17.3 |
| 3,487,033 | 12/1969 | McElmury et al. | 260—17.3 |

FOREIGN PATENTS

| 902,938 | 8/1962 | Great Britain | 260—17.3 |
| 7,645 | 9/1962 | Japan | 260—17.3 |

WILLIAM SHORT, Primary Examiner

E. WOODBERRY, Assistant Examiner

U.S. Cl. X.R.

117—155